United States Patent Office 3,450,595
Patented June 17, 1969

3,450,595
METAL-CLAD LAMINATES
Roy Salter, Maidenhead, Harold Lishman Petrie, Woodley, near Reading, and Ian Williamson, Flackwell Heath, England, assignors to Formica International Limited, London, England, a British company
No Drawing. Filed Sept. 8, 1964, Ser. No. 395,022
Int. Cl. C09j 3/14, 3/16
U.S. Cl. 161—215    7 Claims

ABSTRACT OF THE DISCLOSURE

This application relates to novel adhesive compositions comprising a polyvinyl acetal and an aminotriazine-aldehyde resin (such as a melamine-formaldehyde resin) in a common solvent, and optionally also including a phenol-formaldehyde resin; the compositions may be used in a process wherein a metal foil is laminated under heat and pressure to at least one surface of a core impregnated with a thermosetting resin, with the aid of a layer of said adhesive composition.

---

This invention relates to metal-clad laminates and their production.

Metal-clad laminates, especially copper-clad laminates, have a number of important uses, some of which require a high degree of bond strength between the metal surface and the resin-impregnated core. One example of such use is as a material for the manufacture of printed circuits and like electrical products. Such materials normally comprise a core made up of a number of sheets of paper or other fibrous material laminated together and impregnated with a phenol-formaldehyde or urea-formaldehyde resin, to which the copper cladding is attached by an adhesive. The choice of adhesive gives rise to difficulties in obtaining a bond which not only has adequate strength in itself, but also will stand up to the severe conditions encountered in subsequent immersion in various acid and alkaline electroplating solutions and in soldering operations. An adhesive that has found extensive use is a mixture of phenol-formaldehyde resin and polyvinyl butyral. This normally requires either the interposition of a "barrier" sheet of a melamine-formaldehyde resin between the core and the adhesive layer or the pretreatment of the copper surface if the bond strength and solder resistance are to be adequate.

It is an object of the present invention to provide an adhesive by means of which untreated copper or other metal foils can be caused to adhere strongly to a thermosetting resin-impregnated core without interposing a barrier layer of a melamine-formaldehyde resin or any other such auxiliary material.

In one aspect the invention consists in a process for the manufacture of metal-clad laminates, which comprises laminating a metal foil to one or both surfaces of a thermosetting resin-impregnated core by the action of heat and pressure with the aid of an intermediate adhesive layer comprising an aminotriazine-aldehyde resin and a polyvinyl acetal. The invention also includes laminates so obtained and printed circuits and other metal-coated articles made from them, as well as the adhesive compositions.

Suitable thermosetting resins for use in the core include both natural and synthetic resins, although the latter are preferred. Such resins include phenol-aldehyde resins, which may be modified with, for instance, natural resins, such as rosins or copals, tung oil, glycol diesters of phthalic acid or triesters of phosphoric acid. By "phenol-aldehyde resin" is meant a resin obtained by reaction between a phenol and an aldehyde, for example between phenol itself or a cresol, xylenol, or resorcinol, or a mixture of two or more of these compounds, and formaldehyde and/or acetaldehyde or one or more substances which under suitable conditions react as formaldehyde or acetaldehyde to give condensation resinous products. Preferably at least 90% of the phenolic component is phenol itself, o-, m- or p-cresol, or 3,5-xylenol, or more than one of these. (All ratios, "parts" and proportions are by weight unless otherwise stated.) Other thermosetting resins that may be used are derived from amino compounds which will react with aldehydes, for example urea and melamine compounds and their derivatives, e.g. urea-formaldehyde resins: expoxide resins and furfurol resins can also be used. However, the main advantage of the invention is obtained when the core is impregnated with a phenol-aldehyde or urea-aldehyde resin.

The core or base may be a paper based laminate or other fibrous laminate, but the process is primarily directed to the production of metal coated paper based laminates.

Preferably the adhesive composition contains, besides the aminotriazine-aldehyde resin and the polyvinyl acetal, a thermosetting resin such as a phenol-formaldehyde resin, the ratio of which to the polyvinyl butyral may vary over a very wide range, e.g. from 1:99 to 99:1, but is preferably not higher than 70:30, and especially between 10:90 and 70:30, say between 30:70 and 70:30. The aminotriazine-aldehyde resin is preferably a melamine-formaldehyde resin, and the invention will be further described with particular reference to this embodiment.

The properties of the final metal-clad laminate depend very largely on the proportion of melamine-formaldehyde resin present in the adhesive, which may vary from a few parts per thousand e.g. 0.1 or 0.2% on the total of the thermosetting resin and polyvinyl acetal up to 30 or even 40% on the same basis. Generally speaking, solder resistance is highest at the upper end of the range, while maximum bond strength is attained at considerably lower melamine-formaldehyde resin levels; in practice therefore a compromise value will be chosen, depending on the particular purpose for which the metal-clad laminate is required. For example, in making copper-clad laminates intended for printed circuits, proportions of 5–30% may be used, while for applications in which resistance to severe soldering conditions is not required, proportions between 0.5 and 10% and especially between 1% and 10% are satisfactory.

The invention is applicable to the bonding of metal foils and sheets of varying kinds and thicknesses; the surface of the foil or sheet may be oxidised, etched, plated or otherwise treated to any desired degree to improve the adhesion in the product, but the advantages of the invention are most important when pure and clean metal surfaces are used. Examples of metal foils which can be used are foils of copper (which is of special practical importance), brass, cupro-nickel, zinc, tin, aluminum, gold and silver.

The preferred polyvinyl acetal component is polyvinyl butyral, but acetals derived from other aldehydes, preferably such as have 3–6 or more carbon atoms in the molecule, can be used.

The adhesive is conveniently applied to the base or the metal foil or both in the form of a solution in a common solvent for both or all its components, e.g. an alkyl ether of ethylene glycol such for example as the monomethyl or monoethyl ether.

The invention is illustrated by the following examples.

Example I

A core was built up in the conventional way from 8 sheets of kraft paper impregnated with a phenol-formaldehyde resin of phenol:formaldehyde ratio 1:1.4 and containing 52% resin solids and 5% volatiles, and was laminated with a pure copper foil using as the adhesive a mixture of equal parts by weight of phenol-formaldehyde resin and polyvinyl butyral of molecular weight 180,000 to 270,000 containing 1% of its weight of melamine-formaldehyde resin of mole ratio 1:2.25. The lamination was effected under a pressure of about 78.5 kg./cm.$^2$ by raising the tempreature to 140° C. during 40 minutes and keeping it between 140° and 148° C. for a further 40 minutes. The product had a peel strength (as measured on a Hounsfield tensometer running at 5 cm. per minute, using strips 15.25 cm. x 2.5 cm. and 180° C. peel) of 4.26 kg. and a solder resistance at 230° C. of 15–20 seconds. "Solder resistance" is the length of time, expressed in seconds, that the test specimen may be kept in contact with a solder bath at a temperature of 230° C., before blistering occurs. The minimum time is ten seconds, determined in accordance with Draft British standard specification D63/5642, published June 5, 1963. The reduction in bond strength after a standard acid treatment (5% sulphuric acid at 50–55° C. for 30 minutes, while the laminate served as cathode with a current density of 155 amp. per sq. metre) was only 2.3% and after a standard cyanide treatment 5% alkaline potassium cyanide solution under the same conditions) was only 16.0%. Corresponding figures when the adhesive contained no melamine-formaldehyde resin were: Peel strength 0.63 kg.; solder resistance 0–5 seconds; acid bond strength loss 75%; alkaline cyanide bond strength loss 100%.

Example II

A core was built up from 8 sheets of kraft paper impregnated with a phenol-formaldehyde resin in the conventional way, and was laminated with a pure copper foil using as the adhesive a mixture of 50 parts of a phenol-cresol-formaldehyde resin, 50 parts of polyvinyl butyral and 5% (on the total weight of phenol-cresol-formaldehyde resin and polyvinyl butyral) of melamine-formaldehyde resin. The lamination was effected under a pressure of about 78.5 kg./cm.$^2$ by raising the temperature to 155° C. during 40 minutes and keeping it between 155° C. to 160° C. for a further 40 minutes. The product had a peel strength (measured as in Example I but with a 90° angle of peel) of 2.7 kg. and a solder resistance at 230° C. of 60 seconds and at 250° C. of 17 seconds. Corresponding figures when the adhesive contained no melamine-formaldehyde resin were:

Peel strength: 2.8 kg.
Solder resistance: 7 seconds at 230° C.; 1 second at 250° C.

Example III

Example II was repeated except that the proportions of phenol-formaldehyde resin, polyvinyl butyral and melamine formaldehyde resin in the adhesive were 70:30:5. The test results were:

Peel strength: 3.8 kg.
Solder resistance: above 60 seconds at 230° C.; 24 seconds at 250° C.

The corresponding figures when the adhesive contained no melamine-formaldehyde resin were:

Peel strength: 0.5 kg.
Solder resistance: less than 1 second at 230° C. and at 250° C.

Example IV

Example III was repeated except that 10% of melamine-formaldehyde resin (on the same basis as in Example II) was used. The test results were:

Peel strength: 3.5 kg.
Solder resistance: more than 60 seconds at 230° C.; 31 seconds at 250° C.

These results may be compared with those obtained with the conventional laminate containing no melamine-formaldehyde resin used as the control in Example II.

Example V

Metal-clad laminates were prepared and tested as described in Example III except that 20% and 30% of melamine-formaldehyde resin were used. The results are shown below and compare favourably with the conventional laminate containing no melamine-formaldehyde.

| Amount of melamine-formaldehyde | Peel strength (kg.) | Solder resistance (seconds) | |
|---|---|---|---|
| | | 230° C. | 250° C. |
| 20 parts | 2.8 | >60 | 32 |
| 30 parts | 2.5 | >60 | 40 |

Examples VI to XIX

These examples are shown in a tabular form, and are a repeat of the procedure in Example III except that varying quantities of the adhesive constituents were used. The results obtained are compared with controls in which no melamine-formaldehyde resin was added.

| Example | Adhesive | | | Peel strength, kg./cm.$^2$ (average) | Solder resistance, seconds | |
|---|---|---|---|---|---|---|
| | Polyvinyl butyral | Phenol-formaldehyde resin | Melamine-formaldehyde resin, percent | | 230° C. | 250° C. |
| VI | 80 | 20 | 5 | 0.62 | 54 | 21 |
| Control | 80 | 20 | 0 | 0.22 | <1 | <1 |
| VII | 80 | 20 | 10 | 0.57 | >60 | 26 |
| VIII | 80 | 20 | 20 | 0.48 | >60 | 34 |
| IX | 80 | 20 | 30 | 0.44 | 59 | 22 |
| X | 90 | 10 | 5 | 0.65 | >60 | 17 |
| Control | 90 | 10 | 0 | 0.46 | 5 | 2 |
| XI | 90 | 10 | 10 | 0.60 | >60 | 19 |
| XII | 90 | 10 | 20 | 0.44 | >60 | 30 |
| XIII | 90 | 10 | 30 | 0.46 | >60 | 14 |
| XIV | 100 | 0 | 5 | 0.74 | 44 | 9 |
| Control | 100 | 0 | 0 | 0.11 | 2 | <1 |
| XV | 100 | 0 | 10 | 0.65 | 57 | 12 |
| XVI | 100 | 0 | 20 | 0.57 | 59 | 12 |
| XVII | 100 | 0 | 30 | 0.47 | >60 | 16 |
| XVIII | 40 | 0 | 60 | 0.46 | 0-5 | 0-5 |
| Control | 100 | 0 | 0 | 0.11 | 2 | <1 |
| XIX | 30 | 70 | 5 | 0.27 | 56 | 3 |
| Control | 30 | 70 | 0 | 0.18 | 5 | <1 |

We claim:
1. A process for the production of metal-clad laminates, which comprises laminating a metal foil to at least one surface of a core impregnated with a thermosetting resin selected from the group which consists of phenol-formaldehyde and urea-formaldehyde resins by the action of heat and pressure with the aid of an intermediate adhesive layer comprising 0.5–10% of an uncured melamine-formaldehdye resin and polyvinyl butyral.

2. A process according to claim 1, wherein a metal foil selected from the group which consists of copper, brass, cupro-nickel, zinc, tin, aluminium, gold and silver foils is laminated with the core.

3. A process according to claim 1, wherein the adhesive contains also an uncured phenol-formaldehyde resin, the ratio by weight of the said phenol-formaldehyde resin to the polyvinyl butyral being between 10:90 and 70:30.

4. Metal-clad laminates comprising a core impregnated with a thermoset resin selected from the group which consists of phenol-formaldehyde and urea formaldehyde resins, and a metal foil directly adhesively united to at least one surface of the said core by means of a layer of a composition comprising 0.5–10% of a cured melamine-formaldehyde resin and polyvinyl butyral.

5. Metal-clad laminates according to claim 4 in the form of printed circuits.

6. Metal-clad laminates comprising a core impregnated with a thermoset resin selected from the group which consists of phenol-formaldehyde and urea-formaldehyde resins, and a metal foil directly adhesively united to at least one surface of the said core by means of a layer of a composition comprising a cured phenol-formaldehyde resin, 0.5–10% of a cured melamine-formaldehyde resin, and polyvinyl butyral, the ratio by weight of the said phenol-formaldehyde resin to the polyvinyl butyral being between 10:90 and 70:30.

7. Metal-clad laminates according to claim 6 in the form of printed circuits.

References Cited

UNITED STATES PATENTS

| | | | |
|---|---|---|---|
| 2,403,077 | 7/1946 | Hershberger | 117—75 |
| 2,409,548 | 9/1943 | Debacher | 260—36 |
| 2,481,155 | 9/1949 | Schaefer | 260—67.6 |
| 2,524,727 | 10/1950 | Dudley | 260—67.7 |
| 2,563,898 | 8/1951 | Wilson et al. | 260—29.4 |
| 3,293,109 | 12/1966 | Luce et al. | 161—166 |

EARL M. BERGERT, *Primary Examiner.*

W. E. HOAG, *Assistant Examiner.*

U.S. Cl. X.R.

156—331; 335; 161—219, 248, 258, 263; 260—32.4, 32.8, 33.4, 839, 844

PO-1050
(5/69)

UNITED STATES PATENT OFFICE
CERTIFICATE OF CORRECTION

Patent No. 3,450,595            Dated June 17, 1969

Inventor(s) Roy Salter et al

It is certified that error appears in the above-identified patent and that said Letters Patent are hereby corrected as shown below:

Column 1, line 32, change "aind" to --and--

Column 2, line 13, change "expoxide" to --epoxide--

Column 3, line 9, change "tempreature" to --temperature--

Column 3, line 25, should read --cyanide treatment (5% alkaline potassium cyanide solu--

SIGNED AND
SEALED
MAY 12 1970

(SEAL)
Attest:

Edward M. Fletcher, Jr.
Attesting Officer

WILLIAM E. SCHUYLER, Jr.
Commissioner of Patents